United States Patent

Gitnes (10) Patent No.: US 9,051,981 B2
(45) Date of Patent: Jun. 9, 2015

(54) DYNAMIC BRAKE

(71) Applicant: Moog Inc., East Aurora, NY (US)

(72) Inventor: Seth Gitnes, Snohomish, WA (US)

(73) Assignee: Moog Inc., East Aurora, NY (US)

( * ) Notice: Subject to any disclaimer, the term of this patent is extended or adjusted under 35 U.S.C. 154(b) by 187 days.

(21) Appl. No.: 13/781,796

(22) Filed: Mar. 1, 2013

(65) Prior Publication Data

US 2014/0246279 A1    Sep. 4, 2014

(51) Int. Cl.
*B60T 13/04* (2006.01)
*F16D 59/02* (2006.01)
*F16D 49/00* (2006.01)
F16D 65/02 (2006.01)
F16D 121/22 (2012.01)

(52) U.S. Cl.
CPC ........... *F16D 59/02* (2013.01); *F16D 49/00* (2013.01); *F16D 2065/022* (2013.01); *F16D 2121/22* (2013.01)

(58) Field of Classification Search
USPC ............. 188/72.3, 72.1, 72.2, 171, 161, 72.7, 188/265
See application file for complete search history.

(56) References Cited

U.S. PATENT DOCUMENTS

| | | | |
|---|---|---|---|
| 2,693,254 A | 11/1954 | Barish | |
| 3,659,686 A | 5/1972 | Markley | |
| 4,021,079 A | 5/1977 | Bohusch | |
| 4,030,578 A | 6/1977 | Cacciola et al. | |
| 4,181,201 A | 1/1980 | McCarthy | |
| 4,228,874 A | 10/1980 | Brinkmann et al. | |
| 4,280,073 A * | 7/1981 | Miller | 310/77 |
| 4,445,596 A * | 5/1984 | Waters et al. | 188/171 |
| 5,678,779 A | 10/1997 | Maina | |
| 5,988,342 A * | 11/1999 | Ito et al. | 192/144 |
| 7,921,971 B2 * | 4/2011 | Eiband | 188/72.7 |
| 7,987,950 B2 | 8/2011 | Kim | |
| 8,319,384 B2 | 11/2012 | Hanlon et al. | |
| 2004/0110593 A1 | 6/2004 | Szalony et al. | |

FOREIGN PATENT DOCUMENTS

GB    2303675 A    2/1997

OTHER PUBLICATIONS

Machine Components Corporation, www.machinecomp.com, Spring Wrapped Non-Reversing Solenoid Operated Clutch Brake, CNR Series, Model No. CNR-20-62 Dec. 27, 2012.
Rexnord Corporation, Introduction to Solenoid Brakes (SAB's) Oct. 1, 2012.

* cited by examiner

*Primary Examiner* — Melanie Torres Williams
(74) *Attorney, Agent, or Firm* — Hodgson Russ LLP (57) ABSTRACT

A power-off brake for stopping a rotating shaft comprises a solenoid including a coil and armature, an opposing plate axially spaced from the armature, and a ball carrier rotor between the armature and opposing plate. The ball carrier rotor rotates with the shaft and carries spherical balls in recesses angularly space about the shaft. The armature and opposing plate have respective braking surfaces. In one embodiment, at least one braking surface is ramped to urge the plurality of balls radially outward against an internal surface of a surrounding outer race as the armature is forced toward the opposing plate under spring loading when current to the solenoid coil is shut off. In another embodiment, the braking surfaces are not ramped, such that the balls are merely clamped between the braking surfaces upon solenoid deactivation. Increased rolling friction stops rotation of the ball carrier rotor and the shaft without problematic wear.

17 Claims, 6 Drawing Sheets

DYNAMIC BRAKE

FIELD OF THE INVENTION

The present invention relates generally to dynamic brakes for stopping the rotation of a rotating shaft, and more particularly to solenoid-operated "power-off" dynamic brakes that apply braking force when power to the solenoid is shut off.

BACKGROUND OF THE INVENTION

Figure 1:
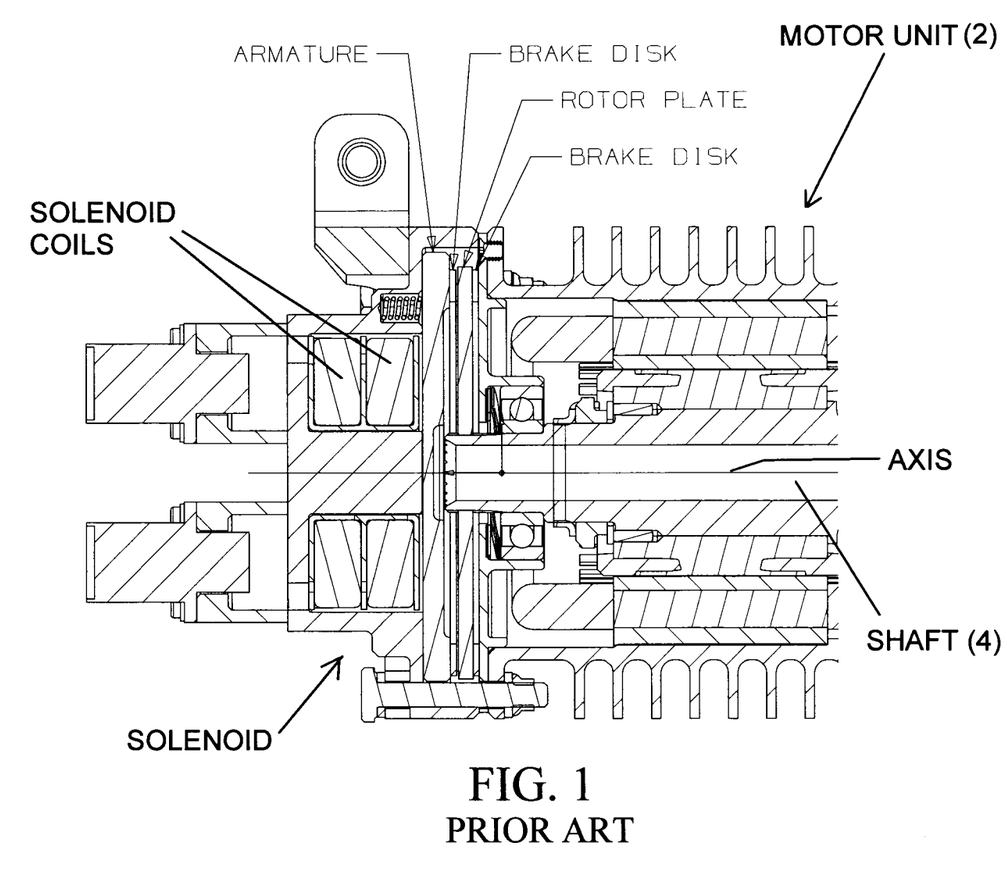
FIG. 1 is a cross-sectional view showing a solenoid-operated dynamic brake mechanism of the prior art.

By way of non-limiting example, dynamic solenoid-operated power-off brakes are used in horizontal stabilizer electric motor units (HSEMU) responsible for actuating control surfaces of an aircraft horizontal stabilizer. A known design used for this purpose is shown in FIG. 1. A motor-driven shaft carries a rotor plate mounted on a splined end of the shaft for rotation with the shaft about a longitudinal axis of the shaft. The brake comprises a solenoid including coils and an armature. A first brake disk is arranged on the armature facing one side of the rotor plate. A second brake disk is arranged on a backing plate facing an opposite side of the rotor plate. When power is supplied to the solenoid coil, the armature with the first brake disk is attracted toward the coils (to the left in FIG. 1) against the urging of springs (only one spring being visible in the cross-sectional view of FIG. 1). Thus, in the power ON state, the rotor plate is not frictionally engaged by the brake disks, thereby allowing rotation of the rotor plate and shaft. When power to the solenoid coils is turned OFF, the de-energized coils no longer pull the armature to the left, such that the springs can force the armature axially toward the rotor plate. When this happens, the brake disks are brought into frictional engagement with opposite sides of the rotor plate to frictionally brake rotation of the rotor plate and shaft.

As may be understood, the prior art brake design shown in FIG. 1 is very sensitive to wearing of the brake disks. As the brake disk pads wear and become thinner, the air gap between the armature and coils of the solenoid becomes greater, thereby reducing the ability of the coils to pull in the armature against the bias of the springs. Maintenance is required to keep the brake mechanism working properly.

There is a need for a dynamic solenoid-operated power-off brake that does not experience decreased performance due to wear.

SUMMARY OF THE INVENTION

The present invention provides a brake mechanism for stopping rotation of a shaft. The brake mechanism greatly reduces brake wear and maintenance requirements associated with brake wear. The brake mechanism generally comprises a solenoid including a coil and an armature, an opposing plate axially spaced from the armature, and a ball carrier rotor between the armature and the opposing plate. The ball carrier rotor is coupled to the shaft for rotation with the shaft, and carries a plurality of spherical balls located in respective recesses angularly spaced around the ball carrier rotor. In an embodiment of the present invention, the balls are radially retained by an outer race having a cylindrical internal surface facing the balls, and one or both of the armature and the opposing plate has a ramp surface configured to urge the plurality of balls radially outward against the internal surface of the outer race as the armature is forced in an axial direction toward the opposing plate under spring loading when current to the solenoid coil is shut off. This wedging action generates friction to stop rotation of the ball carrier rotor and the coupled shaft in a manner that is essentially free of problematic wear. Energizing the solenoid coil causes the armature to move away from the opposing plate against the spring bias, thereby releasing the ball carrier rotor and balls, and the coupled shaft, for rotation.

In another embodiment of the present invention, there is no ramp surface and the spherical balls are clamped solely by opposing surfaces associated with the armature and the opposing plate. In other words, the balls are not urged radially outward during braking.

The present invention also encompasses a method of braking a shaft that is rotating about an axis. The method generally comprises providing a plurality of balls arranged about the axis and coupled to the shaft for rotation therewith, shutting off current to a solenoid to de-energize a coil of the solenoid, applying force to an armature of the solenoid to displace the armature along the axis when the solenoid is de-energized, and clamping the balls between a surface associated with the armature and an opposing surface, for example a surface associated with an opposing plate facing the armature. The method may further comprise the steps of converting the axial displacement of the armature into radially directed force applied to the plurality of balls, and arranging a cylindrical surface about the plurality of balls to oppose the radially directed force.

The present invention does not rely on brake disk pads acting on opposite faces of a rotor plate, and thus avoids the problem of wear mentioned above. The brake mechanism of the present invention provides required braking performance over a longer period of service life than prior art brake mechanisms, thereby reducing maintenance costs.

BRIEF DESCRIPTION OF THE DRAWING VIEWS

The invention will be described in detail below with reference to the accompanying drawing figures, in which.

DETAILED DESCRIPTION OF THE INVENTION

Figure 2:
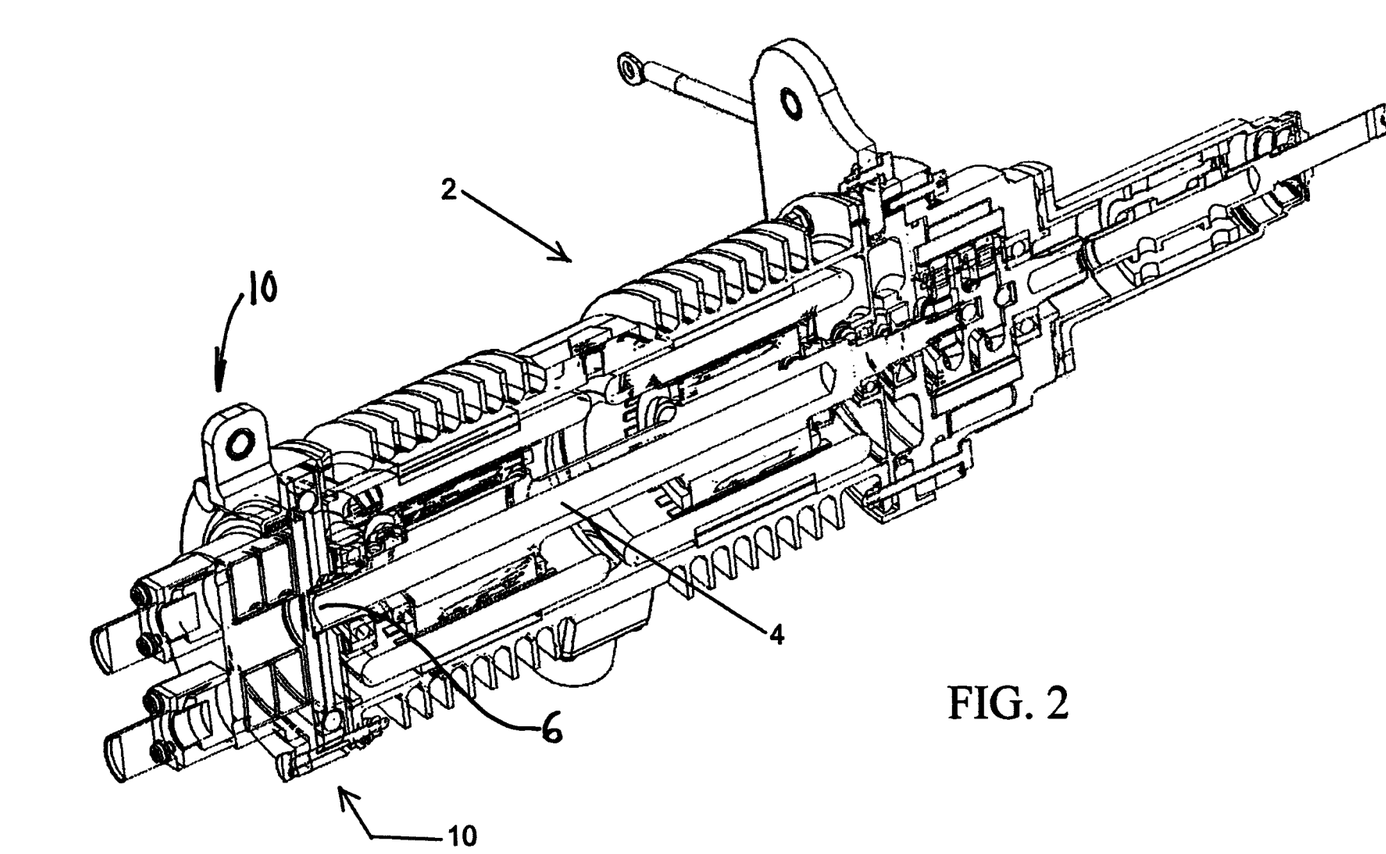
FIG. 2 is a cross-sectioned perspective view showing a solenoid-operated dynamic brake mechanism formed in accordance with an embodiment of the present invention connected to an electric motor unit having a motor-driven shaft.

FIG. 2 depicts a brake mechanism 10 formed in accordance with the present invention for stopping rotation of a shaft 4 driven by a motor unit 2. Brake mechanism 10 is configured as a solenoid-operated power-off brake, and may be used in an HSEMU or in other applications where dynamic braking of a rotating shaft is needed. Brake mechanism 10 may be mounted at a splined end 6 of shaft 4.

Figure 3:
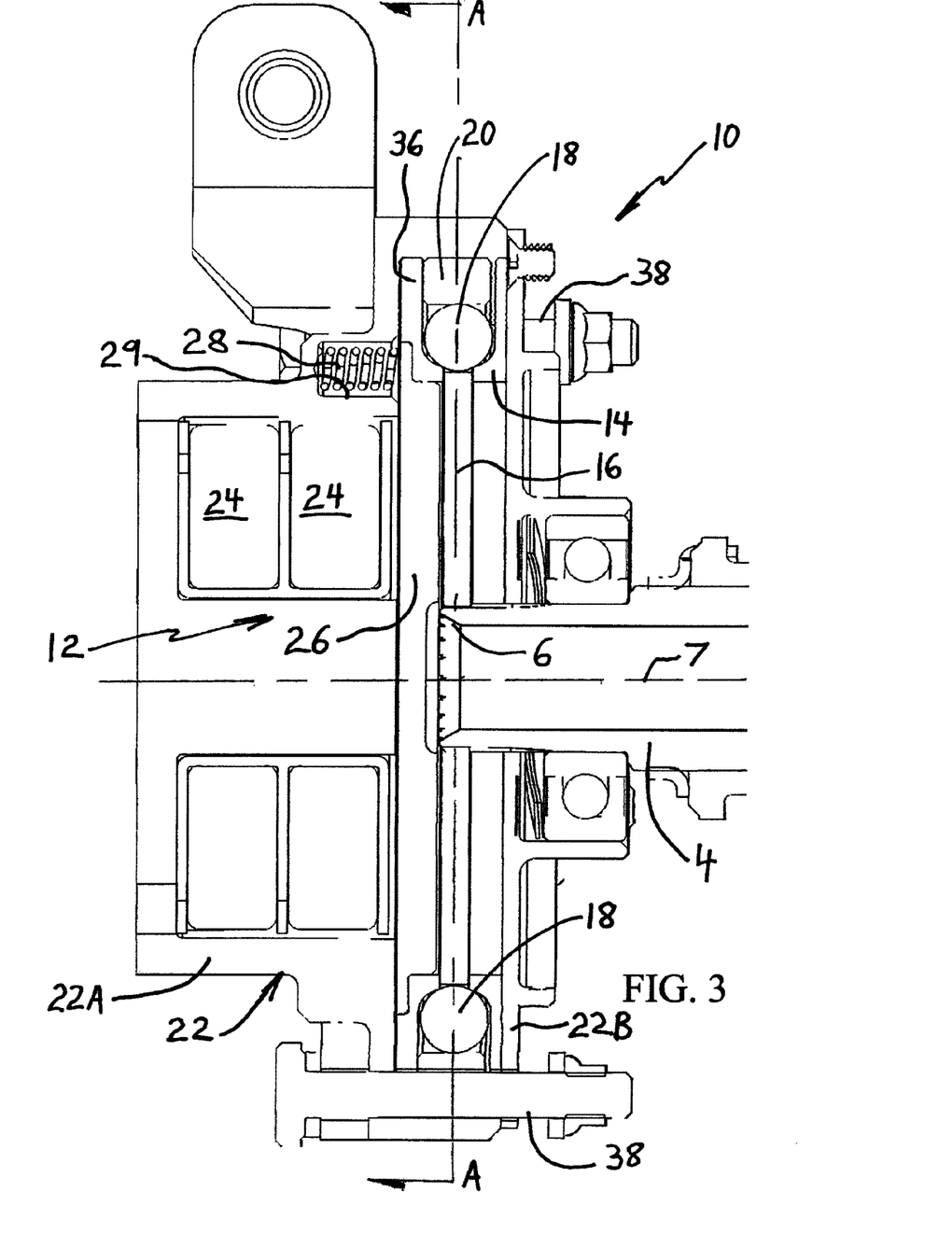
FIG. 3 is a cross-sectional view of the brake mechanism shown in FIG. 2.
Figure 4:
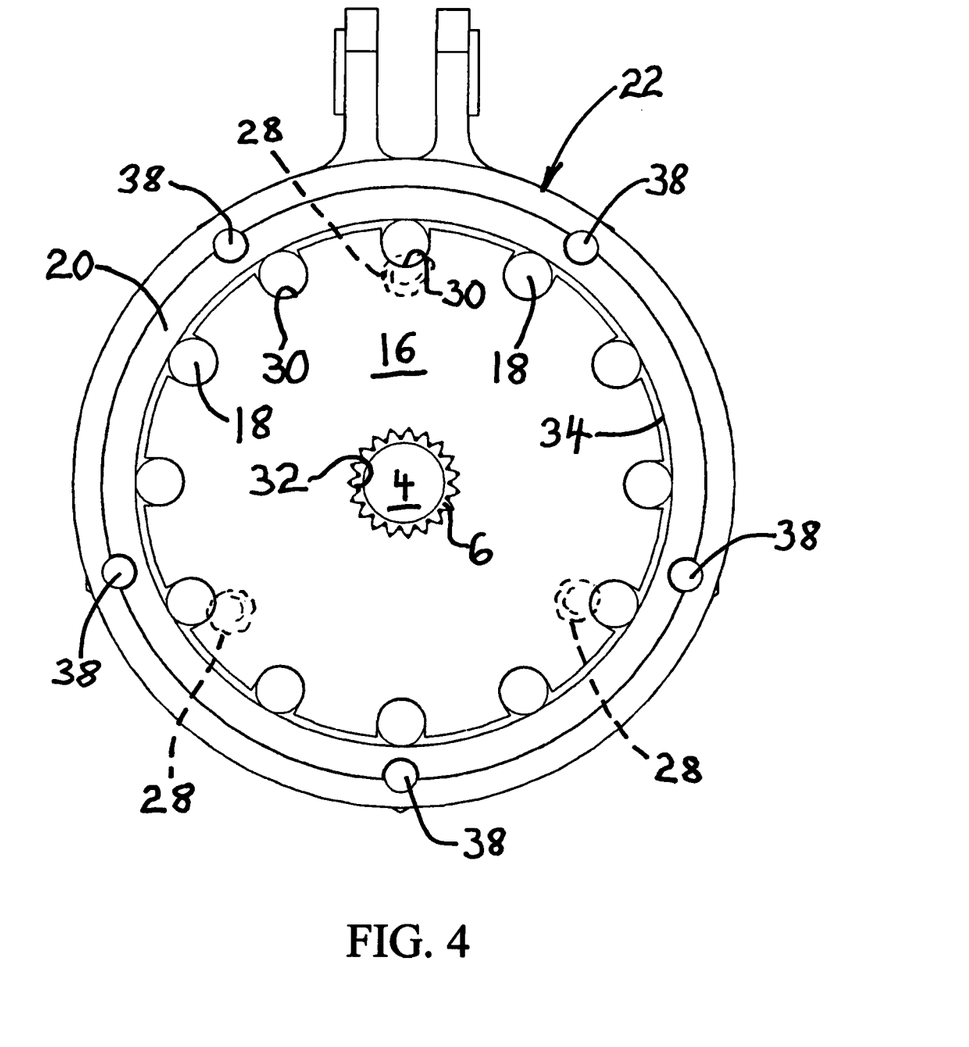
FIG. 4 is a view of the brake mechanism taken generally along the line A-A in FIG. 3.

Reference is also made now to FIGS. 3 and 4. Brake mechanism 10 generally comprises a solenoid 12, an opposing plate 14, a ball carrier rotor 16, a plurality of balls 18, and an outer race 20. A housing of brake mechanism 10 is identified by reference numeral 22.

Solenoid 12 includes a pair of conductive coils 24 and an armature 26. Armature 26 is attracted in a first axial direction toward coils 24 (to the left in FIG. 3) when the coils are energized by current from a power source (not shown). One or more springs 28 bias armature 26 in a second axial direction (to the right in FIG. 3) opposite the first axial direction. Springs 28 may have one end received in a corresponding recess 29 in housing 22 and another end arranged to engage armature 26. As may be seen in FIG. 4, a plurality of coiled springs 28 may be angularly spaced at regular intervals about rotational axis 7 of shaft 4.

Opposing plate 14 is spaced from armature 26 in the second axial direction. Ball carrier rotor 16 is arranged along axis 7 between armature 26 and opposing plate 14. As may be seen in FIG. 4, ball carrier rotor 16 has a plurality of ball-receiving recesses 30 angularly spaced about a circumferential edge of the ball carrier rotor. Ball carrier rotor 16 is mounted on splined end 6 of shaft 4 and has a central toothed opening 32 sized to mate with the teeth of splined end 6, whereby rotational motion of shaft 4 about axis 7 is transmitted to ball carrier rotor 16. As will be understood, the rotational coupling of ball carrier rotor 16 with shaft 4 enables rotation of shaft 4 to be braked by braking rotation of ball carrier rotor 16. Balls 18 are respectively received in ball-receiving recesses 30. Twelve balls 18 and recesses 30 are shown in FIG. 4, however more or fewer balls and recesses may be provided. Outer race 20 includes a cylindrical internal surface 34 facing the plurality of balls 18.

Housing 22 encloses solenoid 12, springs 28, opposing plate 14, ball carrier rotor 16, balls 18, and outer race 20. Housing 22 may have a first housing part 22A and a second housing part 22B connected to the first housing part by elongated fasteners 38 extending parallel to shaft 4. Elongated fasteners 38 may be arranged to extend through respective openings 21 in outer race 20 to prevent rotation of the outer race relative to housing 22.

Figure 5:
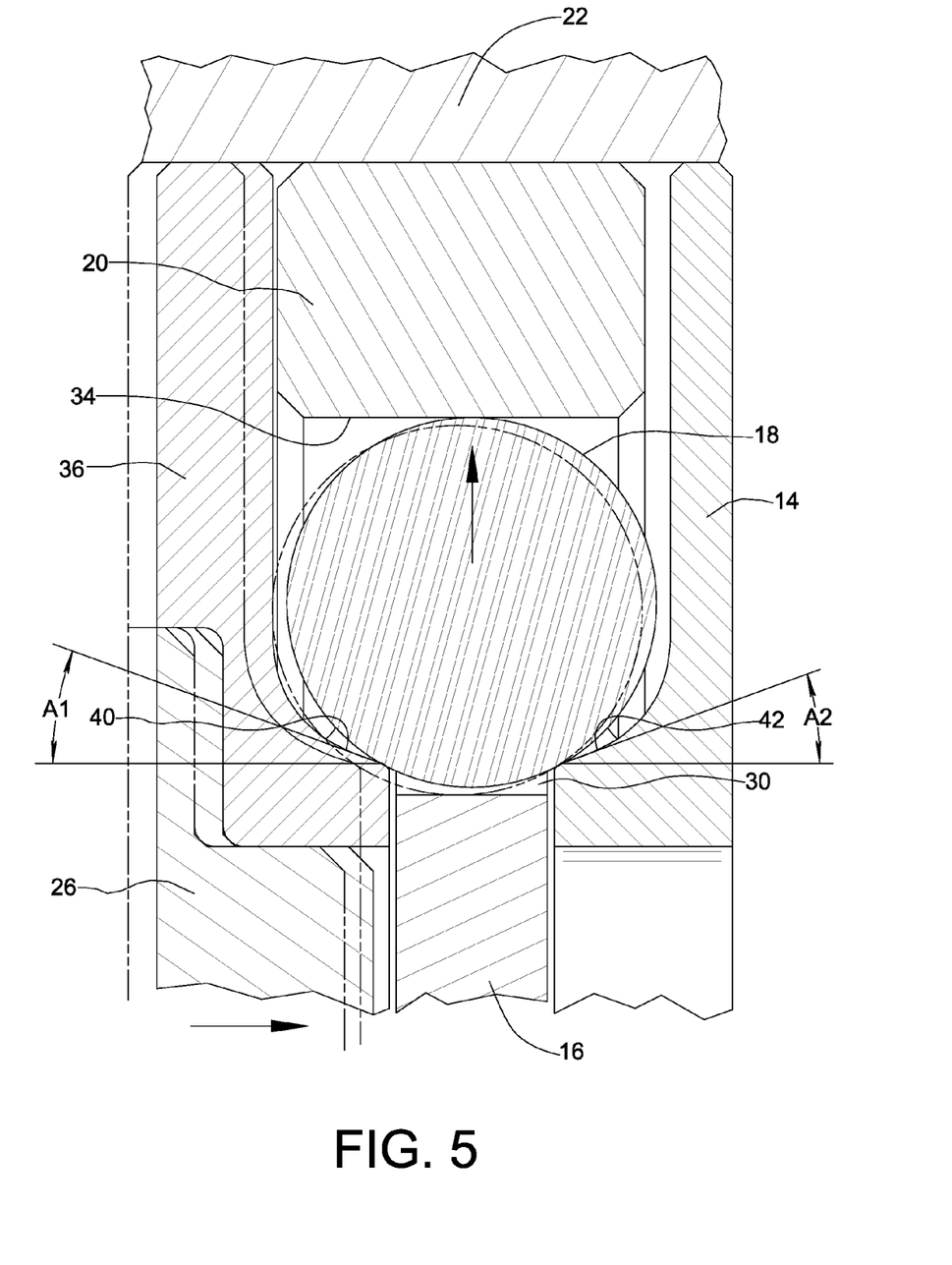
FIG. 5 is an enlarged view showing alternative positions of a pair of ramp surfaces and a ball of the brake mechanism in braked and unbraked states of the brake mechanism.

Reference is made also now to FIG. 5. In accordance with an embodiment of the invention, a pair of ramp surfaces 40 and 42 are associated with armature 26 and opposing plate 14, respectively. Ramp surface 40 may be formed in a ring plate 36 coupled to armature 26 for movement with the armature in the first and second axial directions. Alternatively, ramp surface 40 may be integrally formed in armature 26. Ramp surface 42 may be integrally formed in opposing plate 14 as shown in FIG. 3. Ramp surfaces 40 and 42 face one another and are configured to urge the plurality of balls 18 radially outward from axis 7 against internal surface 34 of outer race 20 as armature 26 moves in the second axial direction under the biasing of springs 28 when current to solenoid coils 24 is shut off. Ramp surface 40 may be an annular ramp surface forming a circular ring about a central axis coinciding with rotational axis 7. In an embodiment of the invention, ramp surface 40 is an annular ramp surface that includes a surface portion tapered at an angle A1 relative to its central axis. Likewise, ramp surface 42 associated with opposing plate 14 may be an annular ramp surface that includes a surface portion tapered at an angle A2 relative to its central axis. Angles A1 and A2 may have the same magnitude or different magnitudes. In the depicted embodiment, A1 and A2 each have a magnitude of approximately 20°.

Operation of brake mechanism 10 will now be described with reference to FIGS. 3 and 5. In FIG. 5, armature 26, ring plate 36, and ball 18 are shown in both solid and phantom line depiction. The solid line depiction, which is hatched to indicate cross-section, corresponds to a braked state of brake mechanism 10. In the braked state, power to solenoid coils 24 is off, and springs 28 force armature 26 and ring plate 36 to the right in FIG. 5 by a slight air gap distance, which may be on the order of about 0.010 inches (0.025 cm). As a result, balls 18 (only one ball being visible) are engaged by ram surfaces 40 and 42 and urged radially outward (i.e. away from axis 7) against internal surface 34 of outer race 20. This wedging action generates friction between balls 18, internal surface 34, and ramp surfaces 40 and 42, whereby rotation of ball carrier rotor 16 and shaft 4 is stopped in a manner that is essentially free of problematic wear.

The phantom line depiction in FIG. 5 corresponds to an unbraked state wherein solenoid coils 24 are energized and armature 26 is attracted to the left (toward the coils) against the bias of springs 28. Thus, in the unbraked state, the friction-generating wedging action is removed so that ball carrier rotor 16, balls 18, and shaft 4 are free to rotate about axis 7.

It is desirable that the materials chosen for balls 18, cylindrical internal surface 34, and ramp surfaces 40, 42 exhibit good hardness, corrosion resistance, and wear resistance. For example, grade 440C stainless steel is a suitable material.

Figure 6:
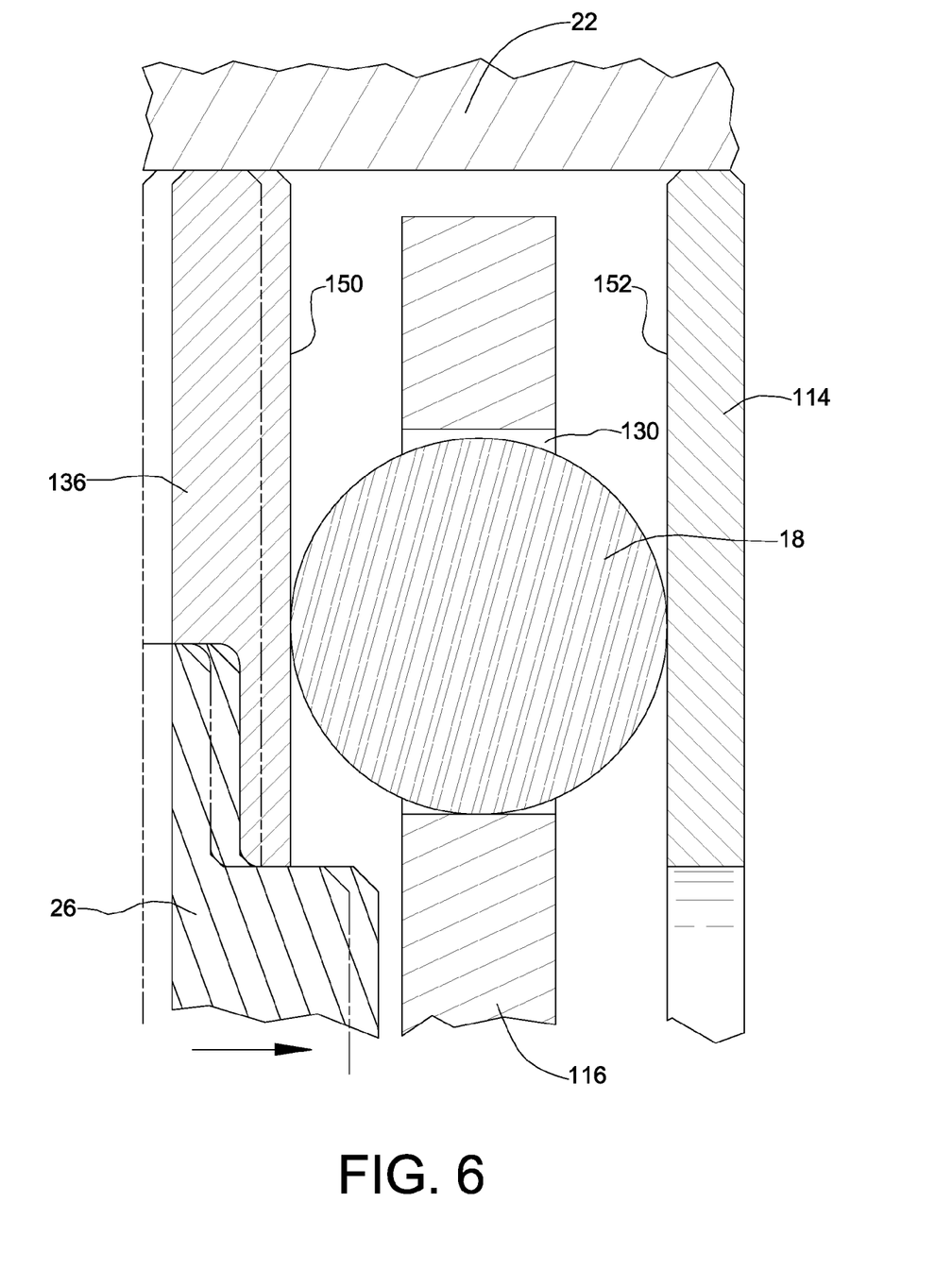
FIG. 6 is a view similar to that of FIG. 5, but showing another embodiment of the present invention without ramp surfaces.

FIG. 6 shows another embodiment in which braking surface 150 associated with armature 26 through ring plate 136, and braking surface 152 associated with opposing plate 114, are flat and do not include ramps to urge balls 18 radially. Accordingly, recesses 130 in ball carrier rotor 116 may be simple round holes through the rotor, and need not open radially through the circumferential edge of the ball carrier rotor. In this way, the balls 18 may be radially retained by the ball carrier rotor itself, and outer race 20 of the first embodiment may be omitted. As shown in FIG. 6, when current to the solenoid coil is stopped, armature 26 with ring plate 136 is forced under spring loading toward opposing plate 114, thereby clamping balls 18 between braking surfaces 150 and 152. In order to match the braking performance of the first embodiment, which realizes increased braking friction due to the wedge-action of the ramps, solenoid 12 and springs 28 in the second "no ramp" embodiment may be chosen to have a higher force capability.

Embodiments of the present invention are described in detail herein, however those skilled in the art will realize that modifications may be made. As one example, it is noted that alternative configurations are possible in which only one ramp surface is provided, either on armature 26 or on opposing plate 14. Such modifications do not stray from the spirit and scope of the invention as defined by the appended claims.

PARTS LIST

2 Motor unit
4 Shaft
6 Splined end of shaft
7 Rotational axis of shaft
10 Brake mechanism
12 Solenoid
14 Opposing plate
16 Ball carrier rotor
18 Balls
20 Outer race
21 Openings in outer race
22 Housing
22A First housing part
22B Second housing part
24 Solenoid coils
26 Armature
28 Springs
29 Recesses in housing for springs 30 Ball-receiving recesses in ball carrier rotor
32 Central toothed opening of ball carrier rotor
34 Cylindrical internal surface of outer race
36 Ring plate
38 Fasteners
40 Ramp surface associated with armature
42 Ramp surface associated with opposing
A1, A2 Ramp surface angles
114 Opposing plate (alternative embodiment)
116 Ball carrier rotor (alternative embodiment)
130 Ball-receiving recesses in ball carrier rotor (alternative embodiment)
136 Ring plate (alternative embodiment)
150 Braking surface (alternative embodiment)
152 Braking surface (alternative embodiment)

What is claimed is:

1. A brake mechanism for stopping rotation of a shaft, the brake mechanism comprising:
a solenoid including a coil and an armature, wherein the armature is attracted in a first direction toward the coil when the coil is energized by current;
at least one spring biasing the armature in a second direction opposite the first direction;
an opposing plate spaced from the armature in the second direction;
a ball carrier rotor arranged between the armature and the opposing plate, the ball carrier rotor having a plurality of ball-receiving recesses angularly spaced about the ball carrier rotor, and the ball carrier rotor being mounted on the shaft for rotation with the shaft;
a plurality of balls received in the plurality of ball-receiving recesses;
wherein the armature and the opposing plate have respective braking surfaces associated therewith for applying braking force to the plurality of balls when current to the coil is shut off;
wherein the plurality of ball-receiving recesses open through a circumferential edge of the ball carrier rotor, the brake mechanism comprises an outer race having a cylindrical internal surface facing the plurality of balls, and at least one of the respective braking surfaces includes a ramp surface, wherein the ramp surface is configured to urge the plurality of balls radially outward against the internal surface of the outer race as the armature moves in the second direction under the biasing of the at least one spring when current to the coil is shut off.

2. The brake mechanism according to claim 1, comprising a pair of ramp surfaces respectively associated with the armature and the opposing plate, the pair of ramp surfaces being configured to urge the plurality of balls radially outward against the internal surface of the outer race as the armature moves in the second direction under the biasing of the at least one spring when current to the coil is shut off.

3. The brake mechanism according to claim 2, wherein the ramp surface associated with the armature is formed on a ring plate coupled to the armature for movement with the armature in the first and second directions.

4. The brake mechanism according to claim 2, wherein the ramp surface associated with the opposing plate is formed integrally in the opposing plate.

5. The brake mechanism according to claim 1, wherein the ramp surface is an annular ramp surface including a surface portion tapered at an angle of approximately 20° relative to a central axis of the annular ramp surface.

6. The brake mechanism according to claim 2, wherein each of the pair of ramp surfaces is an annular ramp surface including a surface portion tapered at an angle of approximately 20° relative to a central axis of the annular ramp surface.

7. The brake mechanism according to claim 1, further comprising a housing enclosing the solenoid, the at least one spring, the opposing plate, the ball carrier rotor, the plurality of balls, and the outer race.

8. The brake mechanism of claim 7, wherein the housing has a first housing part and a second housing part connected to the first housing part by elongated fasteners extending parallel to the shaft, wherein the elongated fasteners extend through respective openings in the outer race to prevent rotation of the outer race relative to the housing.

9. A brake mechanism for stopping rotation of a shaft, the brake mechanism comprising:
a solenoid including a coil and an armature, wherein the armature is attracted in a first direction toward the coil when the coil is energized by current;
at least one spring biasing the armature in a second direction opposite the first direction;
an opposing plate spaced from the armature in the second direction;
a ball carrier rotor arranged between the armature and the opposing plate, the ball carrier rotor having a plurality of ball-receiving recesses angularly spaced about a circumference of the ball carrier rotor, and the ball carrier rotor being mounted on the shaft for rotation with the shaft;
a plurality of balls received in the plurality of ball-receiving recesses;
an outer race having a cylindrical internal surface facing the plurality of balls; and
a ramp surface associated the armature or the opposing plate;
wherein the ramp surface is configured to urge the plurality of balls radially outward against the internal surface of the outer race as the armature moves in the second direction under the biasing of the at least one spring when current to the coil is shut off.

10. In a brake mechanism including a solenoid having an armature forced in a first axial direction by energizing a coil of the solenoid to provide an unbraked state for a shaft rotating about an axis, and at least one spring for causing the armature to move in a second axial direction opposite the first axial direction when the solenoid coil is de-energized to brake the rotation of the shaft, the improvement comprising:
an outer race including a cylindrical internal surface surrounding the shaft; and
at least one ball coupled to the shaft for rotation therewith and urged radially outward against the internal surface of the outer race as the armature moves in the second axial direction under the biasing of the at least one spring when the solenoid coil is de-energized.

11. The improvement according to claim 10, wherein the armature has a ramp surface associated therewith for urging the at least one ball radially outward against the internal surface of the outer race.

12. The brake mechanism according to claim 11, wherein the ramp surface associated with the armature is formed in a ring plate coupled to the armature for movement with the armature in the first and second axial directions.

13. A method of braking a shaft rotating about an axis, the method comprising the steps of:
providing a plurality of balls arranged about the axis and coupled to the shaft for rotation therewith;
shutting off current to a solenoid to de-energize a coil of the solenoid;

applying force to an armature of the solenoid, whereby the armature is displaced along the axis when the solenoid is de-energized;
converting the axial displacement of the armature into radially directed force applied to the plurality of balls; and
arranging a cylindrical surface about the plurality of balls to oppose the radially directed force.

14. The method according to claim 13, wherein the plurality of balls are coupled to the shaft by a ball carrier rotor having a plurality of ball-receiving recesses angularly spaced about a circumference of the ball carrier rotor for receiving the plurality of balls, and wherein the ball carrier rotor is mounted on the shaft for rotation with the shaft.

15. The method according to claim 13, wherein axial displacement of the armature is converted into radially directed force applied to the plurality of balls by at least one ramp surface tapered relative to the axis.

16. The method according to claim 15, wherein the at least one ramp surface includes a first ramp surface displaced axially with the armature.

17. The method according to claim 16, wherein the at least one ramp surface further includes a second ramp surface facing in an opposite axial direction to oppose the first ramp surface.

* * * * *